Figure 1:
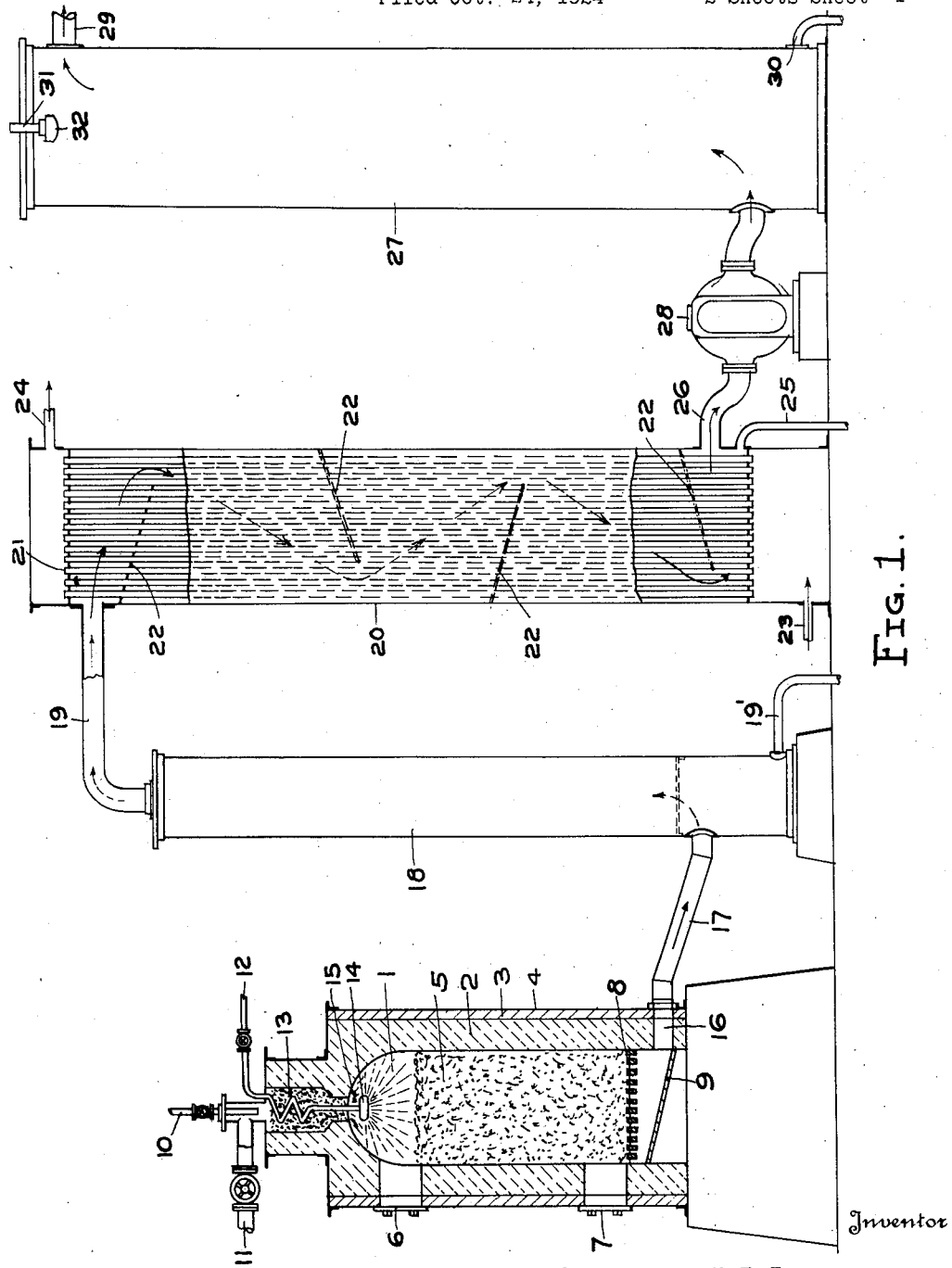

May 21, 1929.  G. W. WALLACE  1,714,198
APPARATUS FOR TREATING OILS
Filed Oct. 24, 1924  2 Sheets-Sheet 1

Inventor
GEORGE W. WALLACE,
By Howard Coombs
Attorney

Patented May 21, 1929.

1,714,198

UNITED STATES PATENT OFFICE.

GEORGE W. WALLACE, OF SAN FRANCISCO, CALIFORNIA.

APPARATUS FOR TREATING OILS.

Application filed October 24, 1924, Serial No. 745,580, and in Great Britain August 1, 1924.

This invention relates to apparatus for the treatment of liquid hydrocarbons, for example, petroleum or shale oil, and consists more specifically in an improved form of apparatus for carrying out such treatment, whereby one or more chemical or physical changes, or both, such, for example, as cracking, are produced in the oil treated.

The principal object of this invention, therefore, is to cause chemical or physical changes, or both, in the properties of the materials under treatment, to take place under the most suitable and controllable conditions of temperature, whereby any undesirable decomposition of the resultant products is avoided or reduced to a minimum.

Specifically, the present apparatus provides for bringing the preheated oil, (preferably preheated) in the liquid, atomized or gaseous, with or without the addition of gases or vapors, for assisting said changes, into contact with the highly heated, or they may even be defined as incandescent, gaseous products of combustion directly as they issue from a burner into a closed chamber, and in controlling the supply of oil to be treated and the heat of the burner in accordance with the reaction and results desired. The resultant products are preferably then caused to traverse a layer consisting of pieces of solid carbon, or of refractory material, in the passage through which the reactions are completed.

The highly heated gases, issuing from the burner to react with the hydrocarbon to be treated can be produced by burning a liquid fuel, or a gas or gases (preferably the combustible products of some previous incomplete combustion) with air, preferably in a surface combustion burner in which the combustion of the fuel takes place in a mass of refractory material, such as carborundum.

With this type of burner, excess of air can be eliminated and, therefore, oxidation of the oils be prevented. Furthermore, such a burner enables the materials under treatment to be brought very efficiently into direct contact with the incandescent, or extremely hot, gases of combustion as they issue from the burner.

Vapors or gases, including steam or superheated steam, having hydrogenizing properties, may be injected under pressure into the chamber at the point where the oil comes into contact with the hot gases, used for atomizing, or spraying the oil which is preferably preheated.

The apparatus for effecting this treatment may be an inclined or horizontal container or chamber, the walls of which may be of metal, firebrick, etc.

Filling materials of a catalytic nature, such as carbon, or pumice or like materials, covered, treated or impregnated with one or more catalytic materials for assisting the chemical or physical changes, or both, may conveniently be used in the chamber or container in which the treatment takes place; it is highly desirable to nearly fill the chamber completely with such materials. If carbon, for example, is used, the pieces or blocks, which increase in size due to carbon deposition in cracking, can be broken up into smaller pieces from time to time and utilized again, or be removed from the chamber and replaced with a fresh charge. So-called briquettes could be used as filling materials, for if cracking is to be the change in question, the deposition of carbon would help to enhance the value of such briquettes.

The reactions take place either under pressure or at a reduced pressure, and the resultant products can be expelled under pressure or withdrawn under reduced pressure and passed into suitable purification, storage apparatus etc.

Figure 2:
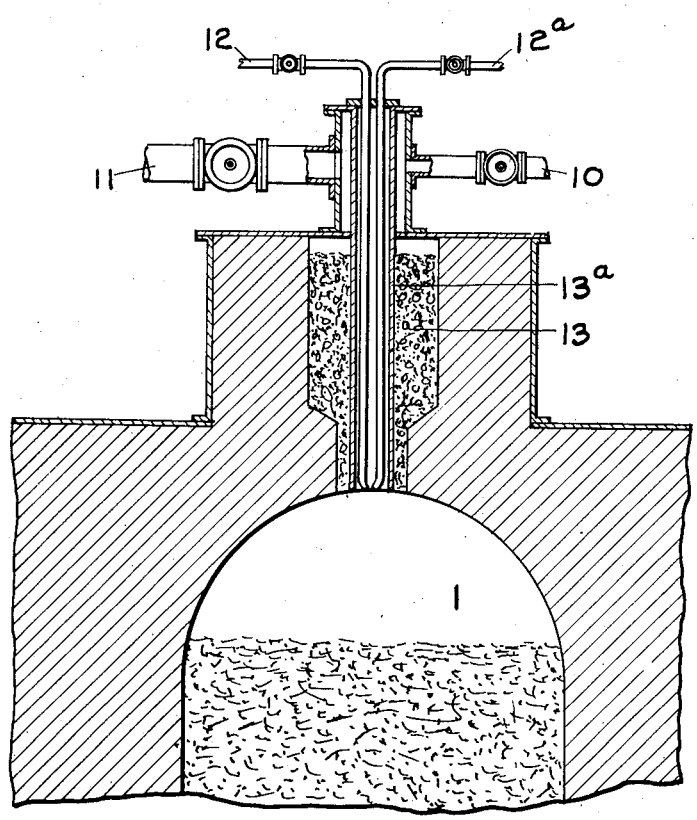

An embodiment of the apparatus constituting the present invention is illustrated, more or less diagrammatically in vertical section in Figure 1 of the accompanying drawings, while Figure 2 shows, by way of example only, an alternative form of burner.

Referring to Figure 1, the numeral 1 represents the chamber wherein the reactions take place. The chamber 1 has a fire-brick lining 2, surrounded with an insulating material 3, both being contained within a steel shell 4. As shown, the chamber 1 is partially filled with pieces of material 5, such as carbon or refractory substances such as firebrick. Doors 6 and 7 are provided for charging and discharging the filling material 5. A grate 8 supports the charge, but such grate may be dispensed with, while an inclined plate or bottom 9 is provided for causing the volatile products which condense in the chamber to travel to the outlet pipe 16. The numeral 10 represents a valve-controlled inlet for the liquid or gaseous fuel to be used in producing the hot gases, while 11 is a valve-controlled air inlet, and 12 a valve-controlled inlet for introducing the material to be treated. A chamber 13, filled with pieces of refractory material, such as carborundum, enables a perfect mixture of the gas and air to be obtained, so that when ignited the combustion is completed in the interstices of the carborundum. In other words, this is a type of surface combustion burner susceptible of perfect control.

The pieces of carborundum or other refractory material in the chamber 1 are held together, for example, by cementing the pieces with a high temperature cement. An atomizing, spraying or injecting device 14 is situated so that the atomized, sprayed or injected material, is preheated by passing through the inlet pipe 12, which, in turn, passes through the carborundum constituting the surface combustion burner. The oil, therefore, comes into direct contact with the highly heated gases at 15, as they issue from the burner. The volatile matters and oils, flowing out of the outlet 16, passes by way of conduit 17 to a dephlegmator 18, where the heavier oils are separated from the vapors and led off through the conduit 19' to a storage tank (not shown). The heavier oils, if desired, may be returned to the chamber 1 with fresh material for further treatment. The oils returning to the chamber 1 would assist in preheating the fresh material, and suitable heat interchangers, (not shown), are provided either for the material itself or for the material plus the returned heavier oils.

From the dephlegmator 18 the volatile products pass by way of pipe 19 to a condenser 20. A tubular water condenser is shown but any of the usual condensers may be employed. The tubes of the condenser 20 are shown at 21 while baffle plates 22 are provided to change the direction, as shown by the arrows, of the volatile products passing around the tubes. The water inlet and outlet of the condenser are shown at 23 and 24 respectively.

The liquids condensed in the condenser 20 pass out of the same by way of conduits 25 to a tank (not shown), from which they are led to storage or subjected to fractional distillation in the well-known manner. The gaseous and uncondensed products leave the condenser by way of conduit 26 and pass into an oil scrubber 27. A blower or compressor 28 may be used for suction purposes but such means may be arranged, if desired, in front of the chamber 1, connected to air inlet 11 if the process is to take place under pressure.

The condensible portions of the gaseous products are removed therefrom in the oil scrubber 27 by scrubbing or contact with an absorbing oil. The volatile products, after the condensible portions have been removed, leave the oil scrubber 27 by way of pipe 29, whence they go to storage or are returned to pipe 10.

The wash oil containing the condensible products absorbed in the oil scrubber 27, leaves the same by way of the pipe 30 and goes to storage or to a subsequent refining treatment in well-known manner.

The aforesaid condensible products, on separation from the wash oil, may be combined with those leaving the condenser 20 or utilized separately, while the wash oil freed from said condensible products is recirculated through the oil scrubber 27 by way of pipe 31 and spraying device 32.

Referring now to Fig. 2, in addition to inlets 10, 11 and 12, an additional inlet 12$^a$ is provided for steam or hydrogenizing agents, for assisting the particular change or changes it is desired to bring about. The inlet pipes 12 and 12$^a$ are encased in a metal tube 13$^a$.

It is to be understood that the invention is not restricted to the particular burner described. Other types of complete combustion burners could be used, provided always that the material under treatment only comes into direct contact with the hot products of combustion but does not actually pass through, the flaming zone of gaseous combustion.

Again it is immaterial how the material under treatment is introduced into the chamber 1. Thus as described and shown in Figure 1, it passes in a coiled pipe through the zone of gaseous combustion, but it may pass in a pipe around the zone of gaseous combustion or through the side walls of the chamber, the important point being that a balance should be secured between the available heat supplied by the combustion and the quantity of material under treatment to enable the temperature at which the chemical and physical changes or both, take place to be properly controlled.

The apparatus may readily be modified by any one skilled in the art so as to work in a horizontal position, the basic idea of the invention being always retained, that is to say, that the material under treatment shall only contact with the hot products of combustion, as stated, and not the flaming zone of gaseous combustion, and that the temperature for bringing the chemical and physical changes about should be properly controlled.

It will be apparent that the principal use of the process and apparatus described is the cracking of oils and, for convenience, I so claim them, although I do not intend to thereby necessarily limit myself to such use.

Having now particularly described the nature of my invention and in what manner the same is to be performed, I declare that what I claim is:—

1. An apparatus for treating hydrocarbon oil, comprising a closed chamber filled with refractory material with a free space at the top, a complete combustion burner leading into said space, an oil inlet pipe passing through said burner, a spray nozzle on the end of said pipe within said space, and means to draw off the products from the bottom of the chamber.

2. Apparatus for treating hydrocarbon oil, comprising a closed chamber containing refractory material but with a free space at the top and having an opening through its top, said opening being filled with refractory material, a burner above the latter, a pipe for the oil to be treated passing through the material in said opening, and a spray nozzle on the inner end of said pipe, whereby, when said burner is ignited, the products of combustion therefrom heat the material in said opening and issue concentrically with said nozzle, surrounding the preheated oil issuing therefrom.

In testimony whereof I have hereunto set my hand.

GEORGE W. WALLACE.